(12) United States Patent
Akcayoz et al.

(10) Patent No.: US 12,018,615 B2
(45) Date of Patent: Jun. 25, 2024

(54) SYSTEMS AND METHODS FOR CONTROLLING AN AIR FLOW RATE FOR A PROPULSION SYSTEM AIR INTAKE

(71) Applicant: Pratt & Whitney Canada Corp., Longueuil (CA)

(72) Inventors: Eray Akcayoz, Cote-Saint-Luc (CA); Mark Cunningham, Montreal (CA); Raja Ramamurthy, Montreal (CA); Roberto Marrano, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/977,680

(22) Filed: Oct. 31, 2022

(65) Prior Publication Data

US 2024/0141833 A1 May 2, 2024

(51) Int. Cl.
| | |
|---|---|
| *F02C 7/057* | (2006.01) |
| *B64D 27/10* | (2006.01) |
| *B64D 33/02* | (2006.01) |
| *F02C 7/052* | (2006.01) |

(52) U.S. Cl.
CPC .............. *F02C 7/057* (2013.01); *B64D 27/10* (2013.01); *B64D 33/02* (2013.01); *F02C 7/052* (2013.01)

(58) Field of Classification Search
CPC .......... F02C 7/052; F02C 7/057; B64D 27/10; B64D 33/02; F02K 1/06; F02K 1/10; F02K 1/78; F02K 1/82
See application file for complete search history.

(56) References Cited

U.S. PATENT DOCUMENTS

| | | | | |
|---|---|---|---|---|
| 3,279,192 A | * | 10/1966 | Hull, Jr. | F02K 3/068 |
| | | | | 415/28 |
| 3,721,389 A | * | 3/1973 | MacKinnon | F02K 1/1207 |
| | | | | 239/265.19 |
| 3,967,443 A | * | 7/1976 | McMurtry | F02K 1/06 |
| | | | | 60/226.1 |
| 4,250,703 A | | 2/1981 | Norris | |
| 4,397,431 A | | 8/1983 | Ben-Porat | |
| 4,972,672 A | | 11/1990 | Sanderson | |
| 8,276,364 B2 | * | 10/2012 | Levasseur | F02K 1/10 |
| | | | | 60/262 |

(Continued)

OTHER PUBLICATIONS

EP Search Report for EP Patent Application No. 23207176.1 dated Mar. 4, 2024.

*Primary Examiner* — Steven M Sutherland
(74) *Attorney, Agent, or Firm* — Getz Balich LLC

(57) ABSTRACT

An air intake for an aircraft propulsion system includes an air inlet duct, a core flow duct, a bypass flow duct, and a flow control device. The air inlet duct includes an intake inlet of the air intake. The core flow duct includes a core flow outlet. The core flow duct extends between and to the air inlet duct and the core flow outlet. The bypass flow duct includes a bypass flow outlet. The bypass flow duct extends between and to the air inlet duct and the bypass flow outlet. The bypass flow duct includes an interior surface forming and surrounding a bypass flow passage through the bypass flow duct. The flow control device is disposed on the interior surface. The flow control device is configured to variably control an area of a cross-sectional flow area of the bypass flow passage.

12 Claims, 5 Drawing Sheets

(56) References Cited

U.S. PATENT DOCUMENTS

| | | | |
|---|---|---|---|
| 8,291,689 B2 * | 10/2012 | Baltas | ............... F02K 1/06 |
| | | | 60/226.3 |
| 10,054,050 B2 | 8/2018 | Michel | |
| 2009/0139398 A1 | 6/2009 | Sheoran | |
| 2019/0226403 A1 | 7/2019 | Burnside | |

* cited by examiner

SYSTEMS AND METHODS FOR CONTROLLING AN AIR FLOW RATE FOR A PROPULSION SYSTEM AIR INTAKE

TECHNICAL FIELD

This disclosure relates generally to air intakes for aircraft propulsion systems and, more particularly, to systems and methods for controlling a bypass flow rate for an air intake.

BACKGROUND OF THE ART

Some propulsion systems for aircraft may include an air intake configured to separate foreign matter (e.g., dust, debris, ice, etc.) entering the air intake from air which is supplied to an engine of the propulsion system. Various systems and methods are known in the art for controlling intake air flow and separating foreign matter from intake air. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an air intake for an aircraft propulsion system includes an air inlet duct, a core flow duct, a bypass flow duct, and a flow control device. The air inlet duct includes an intake inlet of the air intake. The core flow duct includes a core flow outlet. The core flow duct extends between and to the air inlet duct and the core flow outlet. The bypass flow duct includes a bypass flow outlet. The bypass flow duct extends between and to the air inlet duct and the bypass flow outlet. The bypass flow duct includes an interior surface forming and surrounding a bypass flow passage through the bypass flow duct. The flow control device is disposed on the interior surface. The flow control device is configured to variably control an area of a cross-sectional flow area of the bypass flow passage.

In any of the aspects or embodiments described above and herein, the flow control device may circumscribe the cross-sectional flow area.

In any of the aspects or embodiments described above and herein, the flow control device may include an inflatable boot disposed on the interior surface.

In any of the aspects or embodiments described above and herein, the inflatable boot may be selectively positionable in a fully inflated position, a fully deflated position, and a plurality of intermediate inflation positions between the fully inflated position and the fully deflated position.

In any of the aspects or embodiments described above and herein, the flow control device may further include a fluid regulator. The fluid regulator may be configured to be in fluid communication with a pressurized fluid source. The fluid regulator may be configured to direct a pressurized fluid from the pressurized fluid source to the inflatable boot to selectively position the inflatable boot.

In any of the aspects or embodiments described above and herein, a first area of the cross-sectional flow area with the inflatable boot in the fully inflated position may be less than five percent of a second area of the cross-sectional flow area with the inflatable boot in the fully deflated position.

In any of the aspects or embodiments described above and herein, the inflatable boot may be disposed at the bypass flow outlet.

According to another aspect of the present disclosure, a method for controlling an air flow rate for an air intake for an aircraft propulsion system includes determining an operating condition of the aircraft propulsion system, the air intake of the aircraft propulsion system including a core flow duct and a bypass flow duct, and controlling a first air flow rate for the bypass flow duct and a second air flow rate for the core flow duct by controlling a flow control device to selectively vary an area of a cross-sectional flow area of a bypass flow passage of the bypass flow duct based on the determined operating condition.

In any of the aspects or embodiments described above and herein, controlling the flow control device may include selectively positioning an inflatable boot disposed in the bypass flow duct. The inflatable boot may be selectively positionable in a fully inflated position, a fully deflated position, and a plurality of intermediate inflation positions between the fully inflated position and the fully deflated position.

In any of the aspects or embodiments described above and herein, selectively positioning the inflatable boot may include directing a pressurized fluid to the inflatable boot to inflate the inflatable boot.

In any of the aspects or embodiments described above and herein, the determined operational condition may be a cruising condition of the aircraft propulsion system and controlling the flow control device may include selectively positioning the inflatable boot in an inflated position based on the cruising condition.

In any of the aspects or embodiments described above and herein, the determined operational condition may be an icing condition of the aircraft propulsion system and controlling the flow control device may include selectively positioning the inflatable boot in the fully deflated position based on the icing condition.

In any of the aspects or embodiments described above and herein, the method may further include cycling the inflatable boot between a first inflated position and a second inflated position to remove accumulated foreign matter from the inflatable boot.

According to another aspect of the present disclosure, a propulsion system for an aircraft includes a gas turbine engine and an air intake. The gas turbine engine forms a core flow path. The air intake includes an air inlet duct, a core flow duct, a bypass flow duct, and a flow control device. The air inlet duct includes an intake inlet of the air intake. The core flow duct includes a core flow outlet. The core flow duct extends between and to the air inlet duct and the core flow outlet. The core flow duct is configured to direct air from the air inlet duct to the core flow path through the core flow outlet. The bypass flow duct includes a bypass flow outlet. The bypass flow duct extends between and to the air inlet duct and the bypass flow outlet. The bypass flow duct forms a bypass flow passage from the air inlet duct to the bypass flow outlet. The flow control device is configured to variably control an area of a cross-sectional flow area of the bypass flow passage.

In any of the aspects or embodiments described above and herein, the flow control device may include an inflatable boot and a fluid regulator. The inflatable boot may be disposed within the bypass flow passage. The fluid regulator may be in fluid communication with the inflatable boot. The fluid regulator may be configured to selectively position the inflatable boot in a fully inflated position, a fully deflated position, and a plurality of intermediate inflation positions between the fully inflated position and the fully deflated position to control the area of a cross-sectional flow area of the bypass flow passage.

In any of the aspects or embodiments described above and herein, the gas turbine engine may include a compressor forming the core flow path. The fluid regulator may be in fluid communication with the compressor. The fluid regulator may be configured to receive a pressurized fluid from the compressor and direct the pressurized fluid to the inflatable boot.

In any of the aspects or embodiments described above and herein, the propulsion system may include an engine control system. The engine control system may be in signal communication with the fluid regulator. The engine control system may include a processor in communication with a non-transitory memory storing instructions, which instructions when executed by the processor, may cause the processor to: determine an operating condition of the propulsion system and control the fluid regulator to selectively position the inflatable boot to control the area of a cross-sectional flow area of the bypass flow passage based on the determined operating condition.

In any of the aspects or embodiments described above and herein, the instructions, when executed by the processor, may further cause the processor to control the fluid regulator to cycle the inflatable boot between a first inflated position and a second inflated position to remove accumulated foreign matter from the inflatable boot.

In any of the aspects or embodiments described above and herein, the instructions, when executed by the processor, may further cause the processor to control the fluid regulator to cycle the inflatable boot at a selected periodicity based on the determined operating condition.

In any of the aspects or embodiments described above and herein, the instructions, when executed by the processor, may further cause the processor to: identify foreign matter accumulation on the inflatable boot and control the fluid regulator to cycle the inflatable boot based on the identification of foreign matter accumulation.

The present disclosure, and all its aspects, embodiments and advantages associated therewith will become more readily apparent in view of the detailed description provided below, including the accompanying drawings.

DETAILED DESCRIPTION

Figure 1:
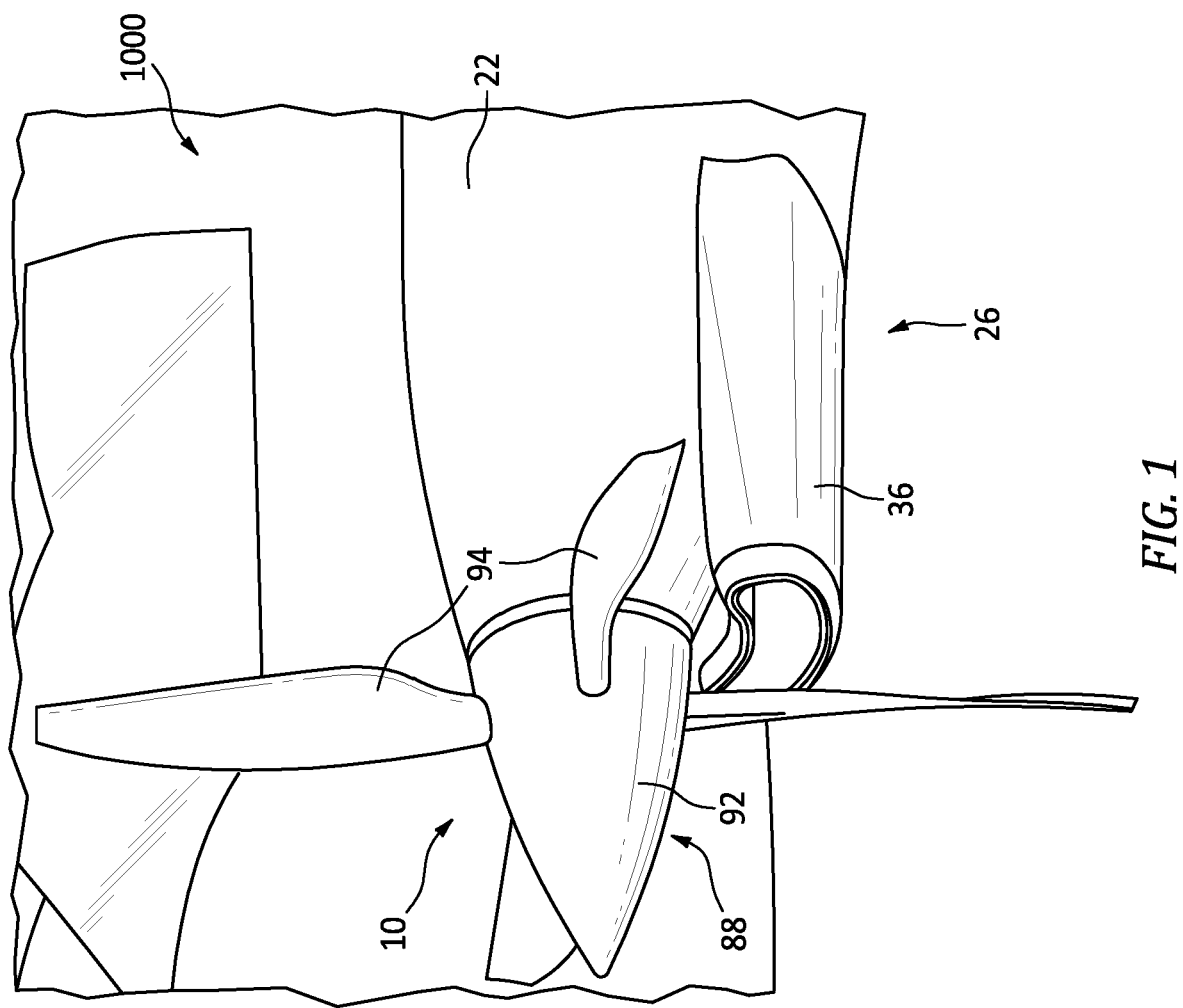
FIG. 1 illustrates a perspective view of a propulsion system for an aircraft, in accordance with one or more embodiments of the present disclosure.
Figure 2:
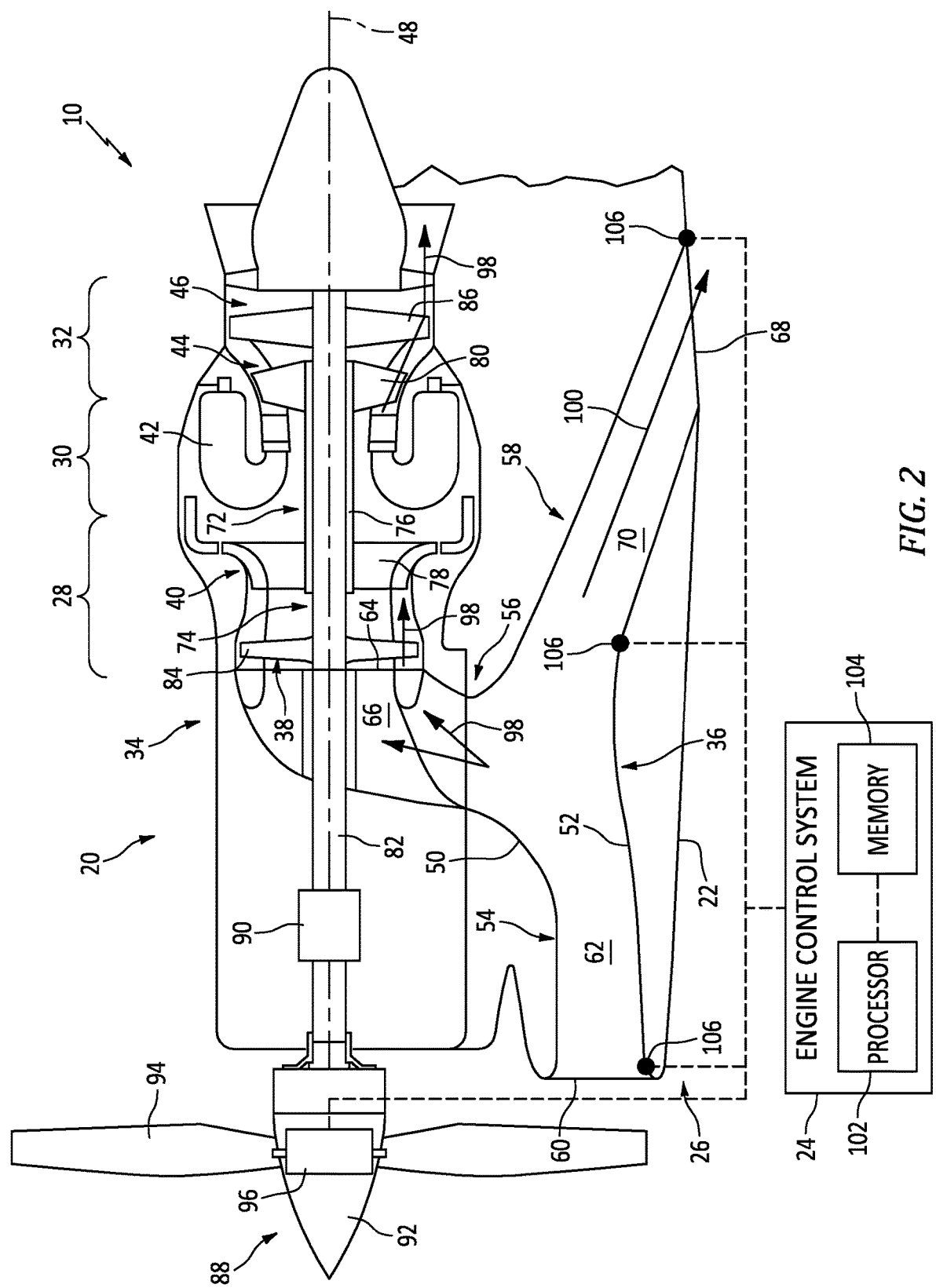
FIG. 2 illustrates a schematic view of the propulsion system of FIG. 1, in accordance with one or more embodiments of the present disclosure.

FIGS. 1 and 2 illustrate a propulsion system 10 for an aircraft 1000. The aircraft propulsion system 10 includes a gas turbine engine 20, a nacelle 22 (e.g., an aircraft propulsion system housing), and an engine control system 24. The propulsion system 10 (e.g., the nacelle 22) may be mounted to or otherwise formed by a portion of the aircraft 1000 such as, but not limited to, a wing or fuselage of the aircraft 1000.

The gas turbine engine 20 of FIGS. 1 and 2 is configured as a turboprop engine. However, the present disclosure is not limited to any particular configuration of gas turbine engine for the propulsion assembly 10, and examples of gas turbine engine configurations for the propulsion system 10 may include, but are not limited to, a turbofan engine, a turbojet engine, a propfan engine, or the like. The gas turbine engine 20 of FIGS. 1 and 2, for example, includes an air inlet section 26, a compressor section 28, a combustor section 30, a turbine section 32, and an engine static structure 34. The air inlet section includes an air intake 36. The compressor section 28 may include a low-pressure compressor (LPC) 38 and a high-pressure compressor (HPC) 40. The combustor section 28 includes an annular combustor 42. The turbine section 32 may include a high-pressure turbine (HPT) 44 and a low-pressure turbine (LPT) 46.

The gas turbine engine 20 sections 28, 30, and 32 of FIG. 2 are arranged sequentially along an axial centerline 48 (e.g., a rotational axis) of the propulsion system 10. The engine static structure 34 may include, for example, one or more engine cases for the gas turbine engine 20. The engine static structure 34 may additionally include cowlings, bearing assemblies, or other structural components of the gas turbine engine 20. The one or more engine cases house and/or structurally support one or more of the engine sections 26, 28, 30, and 32. The engine sections 28, 30, and 32 may be collectively referred to as an "engine core" of the gas turbine engine 20.

The air intake 36 is configured to direct a flow of ambient air into the engine core of the gas turbine engine 20. The air intake 36 of FIGS. 1 and 2 includes an intake body 50. The intake body 50 includes an interior surface 52 forming a series of air passages through the air intake 36. The intake body 50 forms an air inlet duct 54, a core flow duct 56, and a bypass flow duct 58. Each of the air inlet duct 54, the core flow duct 56, and the bypass flow duct 58 include portions of the interior surface 52. For clarity, the air intake 36 of FIG. 2 may be understood to have an exaggerated size relative to other components of the propulsion system 10. The present disclosure, however, is not limited to any particular size of the air intake 36.

The air inlet duct 54 includes an intake inlet 60 of the air intake 36. The intake inlet 60 forms an opening at (e.g., on, adjacent, or proximate) an upstream end of the air intake 36. The air inlet duct 54 may be disposed outside of the gas turbine engine 20 and may be formed by, disposed within, or otherwise in contact with the nacelle 22. The intake inlet 60 of FIGS. 1 and 2 radially offset from the axial centerline 48. For example, the intake inlet 60 (e.g., the entire intake inlet 60) may be radially offset from the axial centerline 48 in a radial direction (e.g., downwardly), as shown in FIGS. 1 and 2. The intake inlet 60 may also be configured with an axial facing orientation. For example, the intake inlet 60 of FIGS. 1 and 2 faces in an axially-forward direction. The present disclosure, however, is not limited to the particular configuration and orientation of the intake inlet of FIGS. 1 and 2. The interior surface 52 of the air inlet duct 54 surrounds and forms an inlet flow passage 62 through the air inlet duct 54. The inlet flow passage 62 extends from the intake inlet 60 to the core flow duct 56 and the bypass flow duct 58.

The core flow duct 56 includes a core outlet 64 of the air intake 36. The core outlet 64 forms an opening at (e.g., on, adjacent, or proximate) a downstream end of the air intake 36. The core outlet 64 is disposed at (e.g., on, adjacent, or proximate) the compressor section 28 to direct ambient air entering the air intake 36 into the compressor section 28. For example, the core outlet 64 of FIG. 2 is disposed at (e.g., on, adjacent, or proximate) and in fluid communication with an inlet of the low-pressure compressor 38. The interior surface 52 of the core flow duct 56 surrounds and forms a core flow passage 66 through the core flow duct 56. The core flow passage 66 extends from the air inlet duct 54 to the core outlet 64. The core flow duct 56 of FIG. 2 extends in a radially inward direction from the air inlet duct 54 to the core outlet 64. The core outlet 64 and portions of the core flow duct 56 may be configured to form an annular portion of the core flow passage 66 extending circumferentially about (e.g., completely around) the axial centerline 48, as shown in FIG. 2.

The bypass flow duct 58 includes a bypass outlet 68 of the air intake 36. The bypass outlet 68 forms an opening at (e.g., on, adjacent, or proximate) a downstream end of the air intake 36. The bypass duct 58 may be disposed outside of the gas turbine engine 20 and may be formed by, disposed within, or otherwise in contact with the nacelle 22. For example, the bypass outlet 68 may be disposed at (e.g., on, adjacent, or proximate) or otherwise formed through an exterior surface of the nacelle 22 to direct air from the air intake 36 to an exterior of the propulsion system 10. The interior surface 52 of the bypass flow duct 58 surrounds and forms a bypass flow passage 70 through the bypass flow duct 58. The bypass flow passage 70 extends from the air inlet duct 54 to the bypass outlet 68. The bypass flow duct 58 of FIG. 2 extends in an axially aft and a radially outward direction from the air inlet duct 54 to the bypass outlet 68.

The gas turbine engine 20 of FIG. 2 further includes a first rotational assembly 72 (e.g., a high-pressure spool) and a second rotational assembly 74 (e.g., a low-pressure spool). The first rotational assembly 72 and the second rotational assembly 74 are mounted for rotation about the axial centerline 48 relative to the engine static structure 34.

The first rotational assembly 72 includes a first shaft 76, a bladed first compressor rotor 78 for the high-pressure compressor 40, and a bladed first turbine rotor 80 for the high-pressure turbine 44. The first shaft 76 interconnects the bladed first compressor rotor 78 and the bladed first turbine rotor 80. The second rotational assembly 74 includes a second shaft 82, a bladed second compressor rotor 84 for the low-pressure compressor 38, a bladed second turbine rotor 86 for the low-pressure turbine 46, and a propeller 88. The second shaft 82 interconnects the bladed second compressor rotor 84 and the bladed second turbine rotor 86. The second shaft 82 may be connected to the propeller 88 by one or more speed-reducing gear assemblies 90 to drive the propeller 88 at a reduced rotational speed relative to the second shaft 82. Alternatively, the second shaft 82 may directly interconnect the propeller 88 with the bladed second compressor rotor 84 and the bladed second turbine rotor 86. The combustor 42 of FIG. 2 is disposed between the bladed first compressor rotor 78 and the bladed first turbine rotor 80 along the axial centerline 48.

The propeller 88 of FIGS. 1 and 2 includes a hub 92 and a plurality of propeller blades 94. The propeller blades 94 are mounted to the hub 92. The propeller blades 94 of FIGS. 1 and 2 are circumferentially distributed about the hub 92 relative to the axial centerline 48. However, it should be understood that the propeller 88 may be configured for rotation about a rotational axis which is different than the axial centerline 48 and, therefore, the propeller blades 94 may be circumferentially distributed about this different rotational axis. The propeller blades 94 extend radially outward from the hub 92. As shown in FIGS. 1 and 2, the propeller blades 94 may extend radially outward from the hub 92 such that the propeller blades 94 radially overlap all or a portion of the intake inlet 60. The propeller blades 94 may be additionally or alternatively be disposed axially forward of the intake inlet 60. In some embodiments, each of the propeller blades 94 may be configured to rotate about a lengthwise axis of the propeller blade 94 to vary a pitch of the propeller blade 94. For example, as shown in FIG. 2, the propulsion assembly 10 or its propeller 88 may include an actuation system 96 configured to effect rotation of the propeller blades 94. The actuation system 96 may be configured as a mechanical actuation system, an electro-mechanical actuation system, a hydraulic actuation system, a pneumatic actuation system, or another other suitable configuration for effecting rotation of the propeller blades 94.

The nacelle 22 houses the gas turbine engine 20 and forms and aerodynamic cover for the propulsion system 10. The nacelle 22 may extend circumferentially about (e.g., completely around) the axial centerline 48. The nacelle 22 may surround and/or support portions of the air intake 36.

During operation of the propulsion system 10 of FIGS. 1 and 2, ambient air enters the propulsion system 10 through the air intake 36 and is directed into a core flow path 98 through core flow passage 66 and a bypass flow path 100 through the bypass flow passage 70. The core flow path 98 extends axially from the core outlet 64 along the axial centerline 48 within the gas turbine engine 20. More particularly, the core flow path 98 extends axially through the gas turbine engine 20 sections 28, 30, 32 of FIG. 2. The air within the core flow path 98 may be referred to as "core air." The core air is compressed by the bladed second compressor rotor 84 and the bladed first compressor rotor 78 and directed into a combustion chamber of the combustor 42. Fuel is injected into the combustion chamber and mixed with the compressed core air to provide a fuel-air mixture. This fuel-air mixture is ignited and combustion products thereof, which may be referred to as "core combustion gas," flow through and sequentially cause the bladed first turbine rotor 80 and the bladed second turbine rotor 86 to rotate. The rotation of the bladed first turbine rotor 80 and the bladed second turbine rotor 86 respectively drive rotation of the first rotational assembly 72 and the second rotational assembly 74. Rotation of the second rotational assembly 74 further drives rotation of the propeller 88 to provide propulsion (e.g., thrust) for the aircraft 1000. Rotation of the propeller 88 in proximity to the intake inlet 60 may induce a circumferential component to a flow direction of the ambient air entering the intake inlet 60, which influence may be referred to as "propeller wash" or "prop wash." The bypass flow path 100 extends through the bypass flow passage 70 from the air inlet duct 54 to the bypass outlet 68. The air within the bypass flow path 100 may be referred to as "bypass air."

The engine control system 24 of FIG. 2 includes a processor 102 and memory 104. The memory 104 is in signal communication with the processor 102. The processor 102 may include any type of computing device, computational circuit, or any type of process or processing circuit capable of executing a series of instructions that are stored in the memory 104, thereby causing the processor 102 to perform or control one or more steps or other processes. The processor 102 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 104 may represent one or more algorithms for controlling aspects of the propulsion system 10, and the stored instructions are not limited to any particular form (e.g., program files, system data, buffers, drivers, utilities, system programs, etc.) provided they can be executed by the processor 102. The memory 104 may be a non-transitory computer readable storage medium configured to store instructions that when executed by one or more processors, cause the one or more processors to perform or cause the performance of certain functions. The memory 104 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the engine control system 24 may be achieved via the use of hardware, software, firmware, or any combination thereof. The engine control system 24 may also include input and output devices (e.g., keyboards, buttons, switches, touch screens, video monitors, sensor readouts, data ports, etc.) that enable the operator to input instructions, receive data, etc. The engine control system 24 may be located within the propulsion system 10 or may be located on the aircraft 1000 (see FIG. 1) on which the propulsion system 10 is installed.

The engine control system 24 may form or otherwise be part of an electronic engine controller (EEC) for the propulsion system 10. The EEC may control operating parameters of the gas turbine engine 20 including, but not limited to, fuel flow, stator vane position (e.g., variable compressor inlet guide vane (IGV) position), compressor air bleed valve position, propeller blade 94 pitch, bypass air flow ratio, etc. so as to control an engine power and/or thrust of the gas turbine engine 20. In some embodiments, the EEC may be part of a full authority digital engine control (FADEC) system for the propulsion system 10.

The engine control system 24 may be configured to receive data associated with operation of the gas turbine engine 20, the propulsion system 10, and/or the aircraft 1000. The data may include operational parameters (e.g., pressure, temperature, fuel flow, rotation speed, shaft torque, etc.) for the gas turbine engine 20. The engine control system 24 may be configured to measure or otherwise obtain operational parameters for the propeller 88 such as, but not limited to, propeller 88 rotation speed and/or pitch positions of the propeller blades 94. For example, the engine control system 24 may be in communication (e.g., signal communication) with the actuation system 96 to receive one or more operational parameters for the propeller 88. The data may include the status of anti-icing systems for the propulsion system 10 and/or the aircraft 1000. The engine control system 24 may include and be in communication (e.g., signal communication) with one or more sensors 106 distributed throughout the gas turbine engine 20. The sensors 106 may include, but are not limited to, one or more of the following exemplary sensors: an air intake pressure sensor, an air intake flow sensor, an air intake temperature sensor, an icing detection sensor, and the like. The sensors 106 may be disposed at one or more locations at (e.g., on, adjacent, or proximate) or within the air intake 36. Additional or alternative sensors 106 (e.g., air speed sensors, air pressure sensors, air temperature sensors, etc.) may be disposed at other locations of the aircraft 1000 or its propulsion system 10. The sensors 106 may be used, for example, to determine or otherwise identify operational conditions of the air intake 36 such as icing conditions, air flow conditions (e.g., core air flow, bypass air flow, etc.), and the like.

During operation of the propulsion system 10, foreign matter such as, but not limited to, water, ice particles, sand, hail, and other debris may enter the air intake 36 with the ambient air. Additionally, ice may form or otherwise accumulate on surfaces of the intake body 50, such as the interior surface 52, and may subsequently be dislodged and carried by air flowing through the air intake 36. If ingested into the engine core, this foreign matter could cause damage to the gas turbine engine 20. The configuration of the air intake 36 may facilitate inertial separation of foreign matter entering the air intake 36 to prevent the foreign matter from being directed into the engine core. For example, foreign matter entering the intake inlet 60 may be unable to be carried by air flow into the core flow passage 66 (e.g., the foreign matter may be unable to make the turn into the core flow passage 66) and the foreign matter may instead be directed into the bypass flow passage 70 and exhausted from the propulsion assembly 10. However, air flow through the bypass flow passage 70 along the bypass flow path 100 may cause a reduction in performance of the air intake 36, resulting in reduced efficiency in the operation of the gas turbine engine 20.

Figure 3:
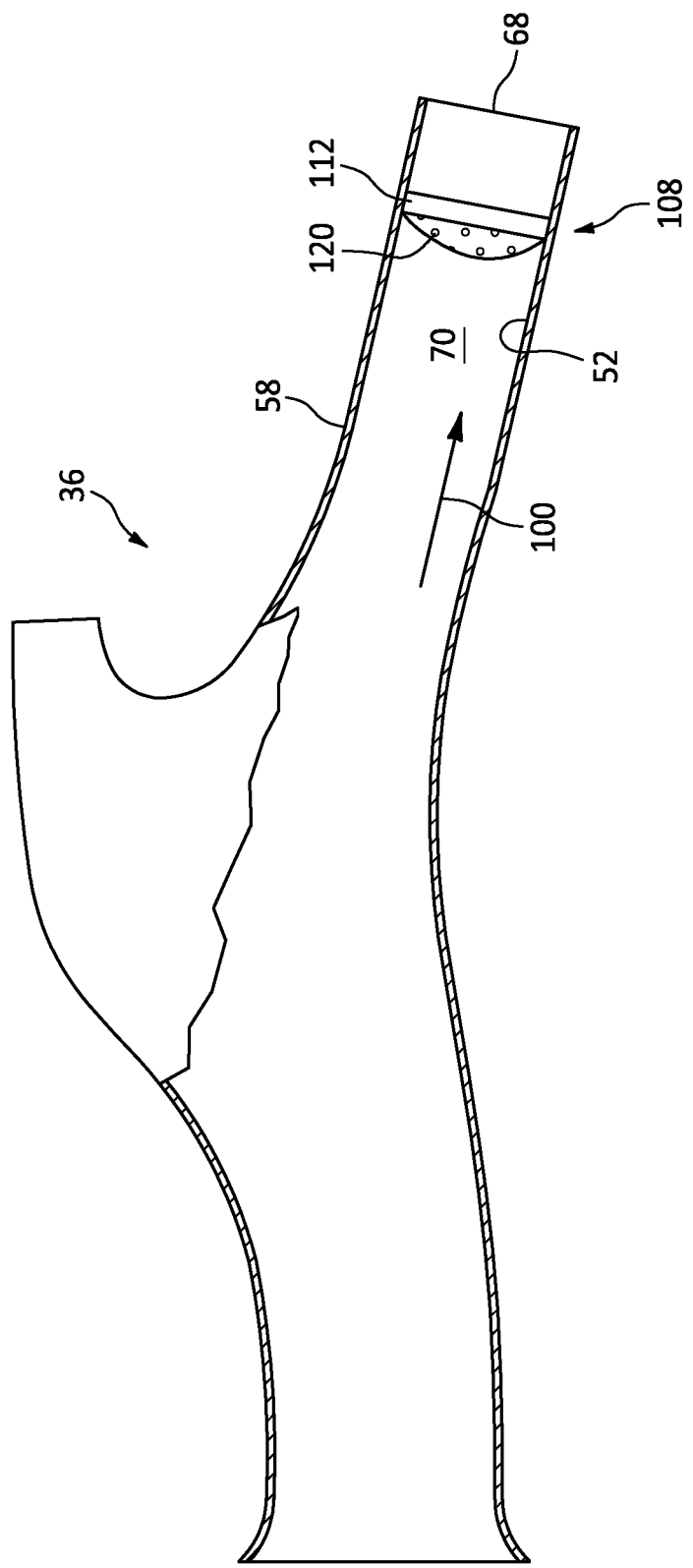
FIG. 3 illustrates a side, cutaway view of a portion of an air intake, in accordance with one or more embodiments of the present disclosure.
Figure 5:
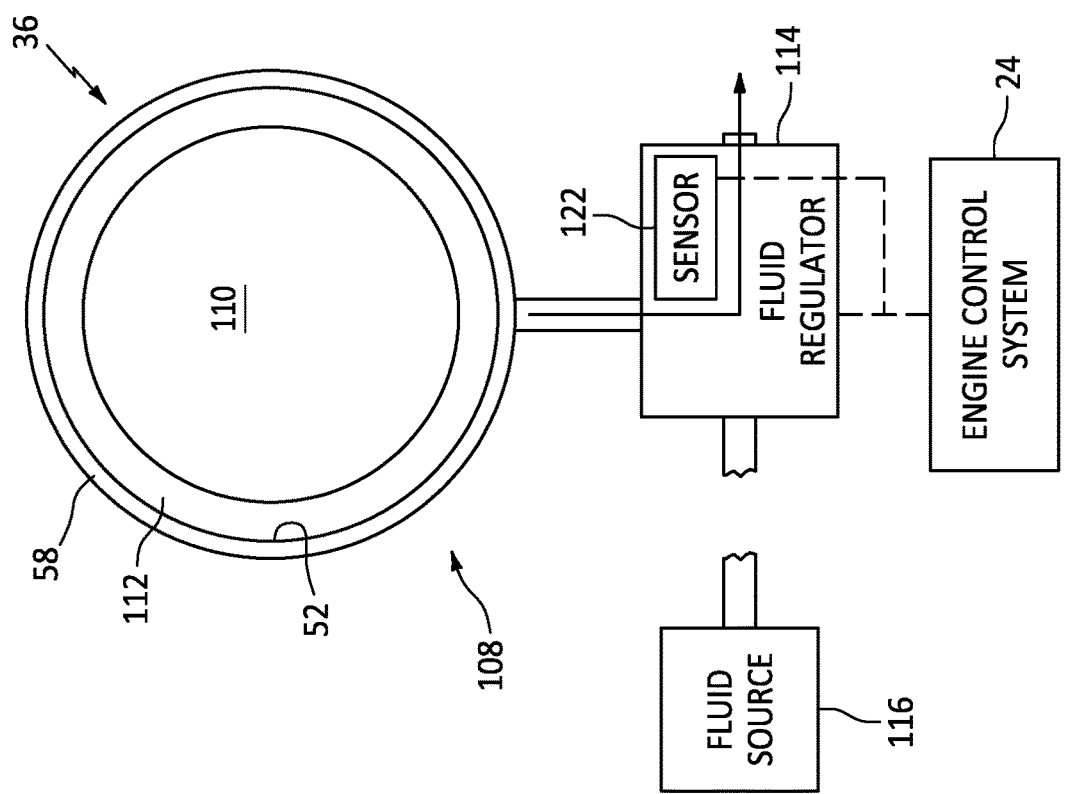
FIG. 5 illustrates another cutaway view of the flow control device for the air intake of FIG. 3, in accordance with one or more embodiments of the present disclosure.
Figure 4:
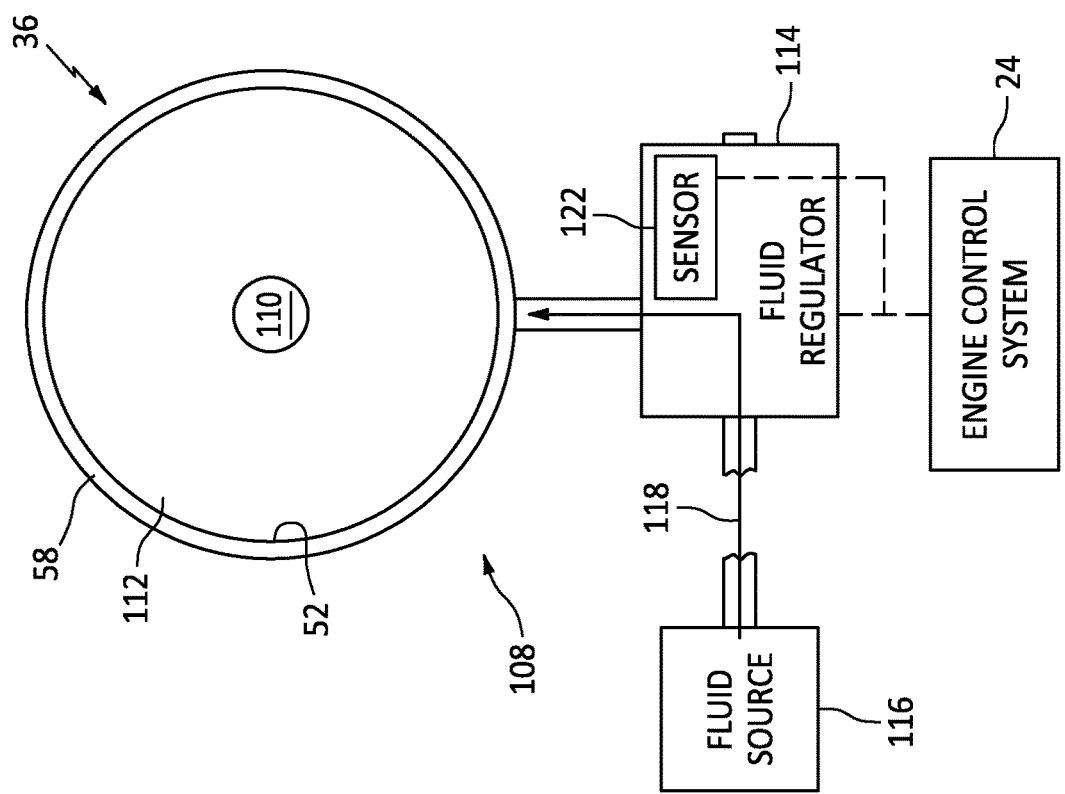
FIG. 4 illustrates a cutaway view of a flow control device for the air intake of FIG. 3, in accordance with one or more embodiments of the present disclosure.

Referring to FIGS. 3-5, the air intake 36 includes a flow control device 108. The flow control device 108 is disposed within the bypass flow duct 58. The flow control device 108 is configured to control an area of a cross-sectional flow area 110 of the bypass flow passage 70, thereby controlling a flow rate of the bypass air flow along the bypass flow path 100. For example, the flow control device 108 is configured to control the area of the cross-sectional flow area 110 to control a flow rate of the bypass air relative to the core air flow rate. It should be understood that the flow control device 108 of the present disclosure is not limited to the particular flow control device 108 configuration illustrated in FIGS. 3-5 provided the flow control device 108 (e.g., vanes, doors, ejectors, etc.) is configured to control the area of the cross-sectional flow area 110 of the bypass flow passage 70.

The flow control device 108 of FIGS. 3-5 includes an inflatable boot 112 and a fluid regulator 114. The inflatable boot 112 is mounted to or otherwise positioned on the interior surface 52. The inflatable boot 112 may have an annular configuration as shown, for example, in FIGS. 4 and 5. The inflatable boot 112 may be mounted to or otherwise positioned on the interior surface 52 about (e.g., completely around) an interior perimeter of the bypass flow duct 58. While the inflatable boot 112 is illustrated with a circular configuration in FIGS. 4 and 5, it should be understood that the inflatable boot 112 may have any shape which corresponds to a shape (e.g., a cross-sectional shape) of the bypass flow duct 58. Accordingly, the inflatable boot 112 may circumscribe the cross-sectional flow area 110. The inflatable boot 112 may be positioned at (e.g., on, adjacent, or proximate) the bypass outlet 68. However, the present disclosure is not limited to any particular location of the inflatable boot 112 within the bypass flow duct 58. The inflatable boot 112 may be formed by or may otherwise include a flexible material such as, but not limited to, rubber and/or another suitable elastomeric material.

The fluid regulator 114 is in fluid communication (e.g., using one or more suitable conduits) with the inflatable boot 112. The fluid regulator 114 is configured to direct a fluid into the inflatable boot 112 to increase a size of (e.g., inflate) the inflatable boot 112. Similarly, the fluid regulator 114 is configured to direct a fluid out of the inflatable boot 112 to decrease a size of (e.g., deflate) the inflatable boot 112. FIG. 4 illustrates the inflatable boot 112 in an inflated position. FIG. 5 illustrates the inflatable boot 112 in a deflated position. The fluid regulator 114 may include one or more components such as, but not limited to, flow control valves (e.g., spring-loaded control valves), pressure-relief valves, fluid vents, and the like so as to direct and control a supply of fluid to or from the inflatable boot 112. The present disclosure, however, is not limited to any particular configuration of the fluid regulator 114. The fluid regulator 114 is in fluid communication (e.g., using one or more suitable conduits) with a pressurized fluid source 116. The fluid regulator 114 configured to receive a pressurized fluid 118 from the pressurized fluid source 116. The pressurized fluid source 116 may include, for example, one of the low-pressure compressor 38 or the high-pressure compressor 40 (see FIG. 2). For example, the low-pressure compressor 38 or the high-pressure compressor 40 may be configured to supply pressurized bleed air (e.g., from an intermediate stage or compressor outlet) to the fluid regulator 114. The fluid regulator 114 may include a pressure sensor 122 configured to measure a pressure of the fluid in or supplied to the inflatable boot 112. The fluid regulator 114 and/or its pressure sensor 122 may be in communication (e.g., signal communication) with the engine control system 24. The inflatable boot 112 may be selectively positionable by the fluid regulator 114 in a fully inflated position, a fully deflated position, and a plurality of inflated positions between the fully inflated position and the fully deflated position.

Figure 6:
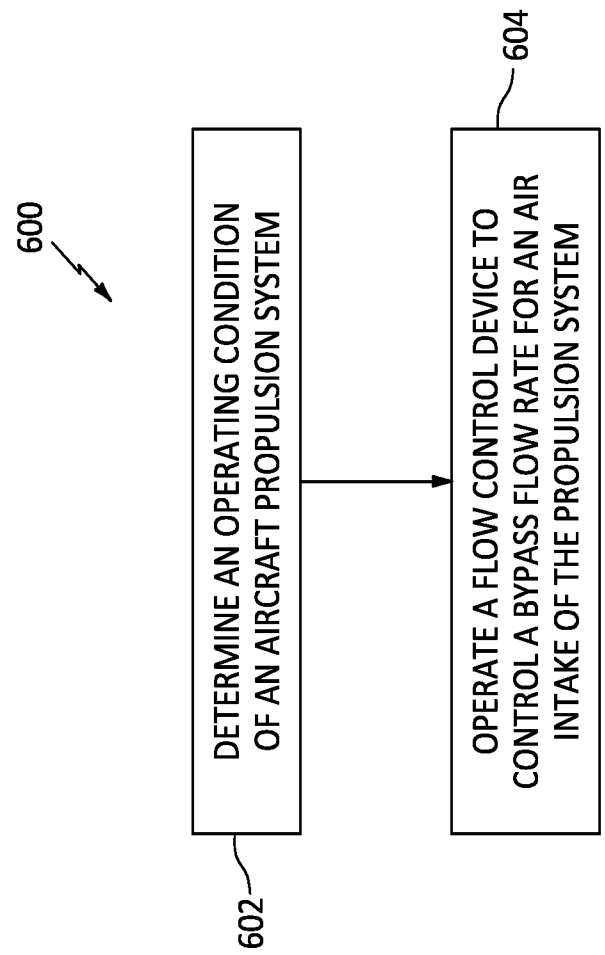
FIG. 6 illustrates a block diagram of a method for controlling a bypass flow rate for an air intake of an aircraft propulsion system, in accordance with one or more embodiments of the present disclosure.

Referring to FIGS. 2-6, a Method 600 for controlling a bypass flow rate for an air intake of an aircraft propulsion system is provided. FIG. 6 illustrates a flowchart for the Method 600. The Method 600 may be performed for the propulsion system 10 and its air intake 36, as described herein. The engine control system 24 may be used to execute or control one or more steps of the Method 600. For example, the processor 102 may execute instructions stored in memory 104, thereby causing the engine control system 24 and/or its processor 102 to execute or otherwise control one or more steps of the Method 600. However, while the Method 600 may be described herein with respect to the propulsion system 10, the air intake 36, and the engine control system 24, the present disclosure Method 600 is not limited to use with the propulsion system 10, the air intake 36, and the engine control system 24 described herein. Unless otherwise noted herein, it should be understood that the steps of Method 600 are not required to be performed in the specific sequence in which they are discussed below and, in some embodiments, the steps of Method 600 may be performed separately or simultaneously.

In Step 602, an operating condition of the propulsion system 10 is determined or otherwise obtained by the engine control system 24. For example, the engine control system 24 may determine that an icing condition exists for the propulsion system 10. An icing condition for the propulsion system 10 may represent an increased likelihood of ice ingestion into the air intake 36 and/or ice formation on surfaces (e.g., the interior surface 52) of the air intake 36. An icing condition for the propulsion system 10 may be a function of the atmospheric state (e.g., ambient air temperature, altitude, ambient air pressure, etc.) and/or an operational state (e.g., cruise, takeoff, landing, etc.) for the propulsion system 10. The atmospheric state and/or the operational state for the propulsion system 10 may be determining using, for example, sensor data from the sensors 106 and/or other sensor data and operational parameters of the aircraft 1000 (see FIG. 1) or its propulsion system 10. For example, during a cruising operational state of the propulsion system 10, the likelihood of ice ingestion or ice formation may be relatively low for the air intake 36. During a takeoff or a landing operational state of the propulsion system 10, the likelihood of ice ingestion or ice formation may be relatively higher (e.g., in comparison to a cruising operational state). The engine control system 24 may determine an icing probability or an icing factor representing the likelihood of an icing condition for the propulsion system 10. The engine control system 24 may identify an icing condition for the propulsion system 10 where the icing probability or icing factor exceeds a threshold value, which threshold value may be a predetermined value a dynamically determined value (e.g., based on the atmospheric state and/or an operational state for the propulsion system 10).

In Step 604, the flow control device 108 may be operated to control the bypass flow rate of bypass air along the bypass flow path 100. In particular, the flow control device 108 may be operated to control the area of the cross-sectional flow area 110. The engine control system 24 may operate or otherwise control the flow control device 108 based on the determined operational condition of the propulsion system 10 (see Step 602). The engine control system 24 may control the fluid regulator 114 to direct the pressurized fluid 116 to the inflatable boot 112 to inflate the inflatable boot 112, thereby increasing a size of the inflatable boot 112 and decreasing the area of the cross-sectional flow area 110. For example, the engine control system 24 may control the fluid regulator 114 to increase a fluid pressure of the inflatable boot 112 (e.g., as measured by the pressure sensor 122) to a predetermined pressure value, which predetermined pressure value may correspond to a selected inflation position for the inflatable boot 112. The engine control system 24 may control the fluid regulator 114 to direct the pressurized fluid 116 out of the inflatable boot 112 to deflate the inflatable boot 112, thereby decreasing a size of the inflatable boot 112 and increasing the area of the cross-sectional flow area 110. The engine control system 24 may, therefore, control the fluid regulator 114 to selectively position the inflatable boot 112 in a fully inflated position, a fully deflated position, and a plurality of intermediate inflation positions. A fully inflated position of the inflatable boot 112 may form a substantially closed or fully closed condition of the cross-sectional flow area 110. For example, a first area of the cross-sectional flow area 110 with the inflatable boot 112 in the fully inflated position may be less than five percent (5%) of a second area of the cross-sectional flow area 110 with the inflatable boot 112 in the fully deflated position. For further example, the inflatable boot 112 in the fully inflated position may provide a bypass air flow ratio of approximately zero percent (0%) to approximately ten percent (10%).

The engine control system 24 may operate or otherwise control a position of the flow control device 108 by determining an open loop target position of the flow control device 108 based, for example, on a measured differential pressure across the flow control device 108 (e.g., using the sensors 106). For example, a target position of the inflatable boot 112 may indicate a percentage open value or a percentage closed value relative to the fully deflated and/or fully inflated positions. Alternatively, the engine control system 24 may operate or otherwise control a position of the flow control device 108 by determining closed loop target position of the flow control device 108 to effect a predetermined bypass ratio for the air intake 36.

The engine control system 24 may control the flow control device 108 to facilitate improved air intake 36 performance and separation of foreign matter. During non-icing conditions of the propulsion assembly 10 and/or when the likelihood of foreign matter ingestion into the air intake may be low, the engine control system 24 may control the fluid regulator 114 to inflate the inflatable boot 112. In this partially or fully inflated position, the inflatable boot 112 may reduce or prevent the flow of bypass air along the bypass flow path 100, thereby increasing the amount (e.g., a ratio of the total air flow into the air intake 36) of ambient air entering the air intake 36 which is directed into the engine core along the core flow path 98. The engine control system 24 may control a size and/or position of the inflatable boot 112 to control a bypass air flow ratio for the air intake 36. In this partially or fully inflated position of the inflatable boot 112, the inflatable boot 112 may still accommodate separation of foreign matter. For example, relatively large foreign matter may be directed into the bypass flow duct 58 and the impact energy of the foreign matter may deflate or momentarily deform the inflatable boot 112 allowing the relatively large foreign matter to be directed through the inflatable boot 112 and exhausted from the propulsion system 10 through the bypass outlet 68. During icing conditions of the propulsion assembly 10 and/or when the likelihood of foreign matter ingestion into the air intake may be relatively high, the engine control system 24 may control the fluid regulator 114 to deflate the inflatable boot 112. In this partially inflated or fully deflated position, the inflatable boot 112 may facilitate an increase in the flow of bypass air along the bypass flow path 100, thereby facilitating the separation of any ingested foreign matter into the bypass flow duct 58 and away from the core flow duct 56.

During operation of the propulsion system 10, foreign matter (illustrated as foreign matter 120 in FIG. 3) may become deposited or otherwise accumulate on the inflatable boot 112. The inflatable boot 112 may be repositioned (e.g., cycled) between a first inflated position and a second inflated position to break up the accumulated foreign matter and allow the foreign matter to be exhausted from the bypass duct. For example, the engine control system 24 may control the fluid regulator 114 to perform a series of deflation and inflation cycles for the inflatable boot 112 to facilitate the removal and exhaust of ice and/or other foreign matter from the air intake 36 and its inflatable boot 112. One or more deflation and inflation cycles for the inflatable boot 112 may be initiated by an operator (e.g., a pilot) of the aircraft 1000 (see FIG. 1). Additionally or alternatively, one or more deflation and inflation cycles for the inflatable boot 112 may be initiated by the engine control system 24. For example, the engine control system 24 may initiate one or more deflation and inflation cycles based on an identification of foreign matter accumulation on the inflatable boot 112 and/or within the bypass flow duct 58. Identification of foreign matter accumulation may be determined, for example, based on a measured differential pressure across the inflatable boot 112, a measured flow rate through the bypass flow duct 58, ice or fluid detection within the bypass flow duct 58, and/or other measured operational parameters for the air intake 36. The measured operational parameters may be compared to one or more predetermined or dynamically determined threshold values to identify the presence and/or severity of accumulated foreign matter in the bypass flow duct 58. The engine control system 24 may also initiate one or more deflation and inflation cycles at a selected periodicity based on the determined operating condition of the propulsion system 10. For example, during a cruising operational condition of the propulsion assembly 10 (e.g., when the risk associated with foreign matter ingestion is relatively low), the engine control system 24 may generally maintain the inflatable boot 112 in the fully inflated position to facilitate improved air intake 36 efficiency, and the engine control system 24 may periodically initiate one or more deflation and inflation cycles to remove any accumulated foreign matter from the bypass flow duct 58.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. An air intake for an aircraft propulsion system, the air intake comprising:
   an air inlet duct, the air inlet duct including an intake inlet of the air intake;
   a core flow duct, the core flow duct including a core flow outlet, the core flow duct extending between and to the air inlet duct and the core flow outlet;
   a bypass flow duct, the bypass flow duct including a bypass flow outlet, the bypass flow duct extending between and to the air inlet duct and the bypass flow outlet, the bypass flow duct including an interior surface forming and surrounding a bypass flow passage through the bypass flow duct; and
   a flow control device including an inflatable boot configured to variably control an area of a cross-sectional flow area of the bypass flow passage, the inflatable boot is disposed on the interior surface, the inflatable boot is selectively positionable in a fully inflated position, a fully deflated position, and a plurality of intermediate inflation positions between the fully inflated position and the fully deflated position;
   wherein a first area of the cross-sectional flow area with the inflatable boot in the fully inflated position is less than five percent of a second area of the cross-sectional flow area with the inflatable boot in the fully deflated position.

2. The air intake of claim 1, wherein the flow control device circumscribes the cross-sectional flow area.

3. The air intake of claim 1, wherein the flow control device further includes a fluid regulator, the fluid regulator configured to be in fluid communication with a pressurized fluid source, the fluid regulator configured to direct a pressurized fluid from the pressurized fluid source to the inflatable boot to selectively position the inflatable boot.

4. The air intake of claim 1, wherein the inflatable boot is disposed at the bypass flow outlet.

5. A method for controlling an air flow rate for an air intake for an aircraft propulsion system, the method comprising:
   determining an operating condition of the aircraft propulsion system, the air intake of the aircraft propulsion system including a core flow duct and a bypass flow duct; and
   controlling a first air flow rate for the bypass flow duct and a second air flow rate for the core flow duct by controlling a flow control device including an inflatable boot disposed in the bypass duct by selectively positioning the inflatable boot to selectively vary an area of a cross- sectional flow area of a bypass flow passage of the bypass flow duct based on the operating condition, and the inflatable boot is selectively positionable in a fully inflated position, a fully deflated position, and a plurality of intermediate inflation positions between the fully inflated position and the fully deflated position;
   wherein the operating condition is an icing condition of the aircraft propulsion system and controlling the flow control device includes selectively positioning the inflatable boot in the fully deflated position based on the icing condition.

6. The method of claim 5, wherein selectively positioning the inflatable boot includes directing a pressurized fluid to the inflatable boot to inflate the inflatable boot.

7. The method of claim 5, wherein the operating condition is a cruising condition of the aircraft propulsion system and controlling the flow control device includes selectively positioning the inflatable boot in an inflated position based on the cruising condition.

8. The method of claim 5, further comprising cycling the inflatable boot between a first inflated position and a second inflated position to remove accumulated foreign matter from the inflatable boot.

9. A propulsion system for an aircraft, the propulsion system comprising:
   a gas turbine engine forming a core flow path;
   an air intake, the air intake including an air inlet duct, a core flow duct, a bypass flow duct, and a flow control device, the air inlet duct including an intake inlet of the air intake, the core flow duct including a core flow outlet, the core flow duct extending between and to the air inlet duct and the core flow outlet; the core flow duct configured to direct air from the air inlet duct to the core flow path through the core flow outlet, the bypass flow duct includes a bypass flow outlet, the bypass flow duct extending between and to the air inlet duct and the bypass flow outlet, the bypass flow duct forming a bypass flow passage from the air inlet duct to the bypass flow outlet, the flow control device includes an inflatable boot and a fluid regulator, the inflatable boot disposed within the bypass flow passage, the fluid regulator in fluid communication with the inflatable boot, the fluid regulator configured to selectively position the inflatable boot in a fully inflated position, a fully deflated position, and a plurality of intermediate inflation positions between the fully inflated position and the fully deflated position to control the area of a cross-sectional flow area of the bypass flow passage; and
   an engine control system in signal communication with the fluid regulator, the engine control system including a processor in communication with a non-transitory memory storing instructions, which instructions when executed by the processor, cause the processor to:
      determine an operating condition of the propulsion system; and
      control the fluid regulator to selectively position the inflatable boot to control the area of a cross-sectional flow area of the bypass flow passage based the operating condition; and
      cycle the inflatable boot between a first inflated position and a second inflated position to remove accumulated foreign matter from the inflatable boot, each of the first inflated position and the second inflated position is one of the fully inflated position, the fully deflated position, or one of the plurality of intermediate inflation positions.

10. The propulsion system of claim 9, wherein the gas turbine engine includes a compressor forming the core flow path, the fluid regulator in fluid communication with the compressor, the fluid regulator configured to receive a pressurized fluid from the compressor and direct the pressurized fluid to the inflatable boot.

11. The propulsion system of claim 9, wherein the instructions, when executed by the processor, further cause the processor to control the fluid regulator to cycle the inflatable boot at a selected periodicity based on the operating condition.

12. The propulsion system of claim 9, wherein the instructions, when executed by the processor, further cause the processor to:
 identify foreign matter accumulation on the inflatable boot; and
 control the fluid regulator to cycle the inflatable boot based on the identification of foreign matter accumulation.

\* \* \* \* \*